United States Patent [19]

Fushimoto

[11] Patent Number: 4,600,257
[45] Date of Patent: Jul. 15, 1986

[54] ELECTRONIC MEMORY DEVICE
[75] Inventor: Hideo Fushimoto, Kawasaki, Japan
[73] Assignee: Canon Kabushiki Kaisha, Tokyo, Japan
[21] Appl. No.: 585,150
[22] Filed: Mar. 1, 1984
[30] Foreign Application Priority Data
   Mar. 8, 1983 [JP] Japan .................................. 58-36726
[51] Int. Cl.[4] .......................................... H01R 13/453
[52] U.S. Cl. ............................................ 339/40; 339/36
[58] Field of Search ............................. 339/36, 40, 41; 220/348

[56] References Cited
U.S. PATENT DOCUMENTS

| | | | | |
|---|---|---|---|---|
| 2,225,623 | 12/1940 | Crawford | ............................. | 220/348 |
| 2,552,061 | 5/1951 | Popp | ..................................... | 339/36 |
| 3,068,442 | 12/1962 | Kubik et al. | ........................... | 339/36 |
| 4,057,167 | 11/1977 | Lee | ........................................ | 220/348 |
| 4,119,813 | 10/1978 | Sato | ....................................... | 339/40 |

Primary Examiner—John McQuade
Attorney, Agent, or Firm—Fitzpatrick, Cella, Harper & Scinto

[57] ABSTRACT

An electronic apparatus having thereon an external connection device in a freely detachable manner to effect electrical connection with the electrical apparatus which is constructed with an opening and closing device provided on the external connection device and performing opening and closing of a connecting part to realize the electrical connection with the electronic apparatus; a closing device provided on the external connection device and to render the opening and closing device to be in a closed state with respect to the connecting part; and a releasing device provided on the electronic apparatus and to release the opening and closing device from its closed state to render it to be in an open state, when the external connection device is mounted on the electronic apparatus, thereby exposing the connecting part.

8 Claims, 12 Drawing Figures

FIG. I
PRIOR ART 4,600,257

ELECTRONIC MEMORY DEVICE

BACKGROUND OF THE INVENTION

1. Field of the Invention

This invention relates to an electronic apparatus, and, more particularly, it is concerned with an electronic apparatus of a construction capable of detachably mounting thereon an external memory device which supplies programs or data stored therein to such electronic apparatus.

2. Description of Prior Art

Conventionally, the electronic apparatuses and appliances such as electronic calculators, etc. having the programming functions are so constructed that an external memory device such as a memory card, etc. storing therein predetermined programs or data in advance is mounted on the main body of the electronic apparatus depending on necessity, thereby making it possible to expand the operational functions of the electronic apparatus. Owing to such construction, users of these electronic apparatuses may be liberated from troublesome operations of making complicated programs and data input by manipulation of the keys arranged on the main body of the electronic apparatus hence these apparatuses become highly convenient and useful.

As an expedient for connecting the external memory device with the main body of the electronic apparatus, thereby making it possible to supply the stored programs and data from the external memory device to the electronic apparatus, there has so far been adopted such a construction that a plurality of connection patterns are formed on the external memory device in an exposed condition, and these connection patterns are brought into contact with a plurality of corresponding contacts provided in advance on the main body of the electronic apparatus.

FIGS. 1 to 3 of the accompanying drawing illustrate a construction of a conventional electronic apparatus using the memory card as the external memory device. In the drawing, the main body of the electronic apparatus, as designated by a reference numeral 1, is composed of an upper casing 1a and a lower casing 1b, both of which are joined together by fitting or screw-connection. In the upper casing 1a, there are provided input means such as keyboard 2, etc. and a display device 3 to display the results of input and output operations. A reference numeral 4 represents a memory card, on one surface side of which a contact pattern 5 appears through a window opening 6. On the other hand, a housing section 7 for the memory card 4 is formed in the rear surface side of the lower casing 1b of the electronic apparatus main body 1. On the bottom surface of this housing section 7, there is provided in a slightly projected state a press-contact type connector 8 so as to be electrically connected with the above-mentioned contact pattern 5. A lid 9 is provided at one edge of the housing section 7 in a freely openable and closable manner. A small projection 9a provided on one end of the lid 9 comes into contact with a movable stopper 10 positioned on the main body opposite to the small projection, and becomes engaged with the stopper 10, while displacing the same, whereby the contact pattern 5 of the memory card 4 placed in the housing section 7 and the press-contact type connector 8 can be kept in a mutually press-contacted condition.

The press-contact type connector 8 has its base part 8a fixedly secured on a printed circuit wiring board 12 with solder, and its top end part protruded from a window opening 11 formed at one part of the bottom surface of the housing section 7. On the other hand, the memory card 4 contains therein a printed circuit wiring board 14 having various memory elements 13 provided thereon. A reference numeral 15 in FIG. 3 designates a rotational shaft for the above-mentioned lid 9.

When adopting such construction, however, there inevitably take place such disadvantages that the contact pattern 5 is corroded to be a cause of poor contact with the connector 8 because the contact pattern 5 is constantly exposed outside from the surface of the memory card 4, and that static electricity is directly applied to the contact pattern 5 to destroy the memory elements 13 in the memory card 4 because the contact pattern 5 is readily accessible.

In order therefore to eliminate such disadvantages as mentioned above, there has been proposed an improved external memory device by the same applicant as in the present application, as shown in FIGS. 4 to 8 of the accompanying drawing.

That is to say, the memory card as the external memory device illustrated in FIGS. 4 to 8 contains the printed circuit wiring board 14 in its lower casing 26. On the upper surface side of this printed circuit wiring board 14, there is disposed a spacer 25 having a window opening 25a formed in one part thereof. This window opening 25a corresponds in position to the contact pattern 5 on the printed circuit wiring board 14.

A guide plate 21 having a size about half that of the spacer 25 is placed on the upper surface side of the spacer. Also, a shutter plate 17 is placed on the upper surface side of the spacer 25 in a state of being complementary to the guide plate 21. The shutter plate 17 has a male part 17a which is slidably fitted in and out of a female part 21a of the above-mentioned guide plate 21. From the upper surface of the male part 17a, projects a knob 18. Further, the shutter plate 17 has a window opening 22 corresponding to the window opening 25a of the spacer 25. Over the upper surface side of the shutter plate 17 and the guide plate 21, there is placed a top plate 20. The top plate 20 has an opening 6 formed therein at a position corresponding to the contact pattern 5, adjacent to which a slot 19 to receive therein the above-mentioned knob 18 is formed in the direction normal to the lengthwise direction of the opening 6.

In the memory card of the above-described construction, an earth pattern 23 is formed on the printed circuit wiring board 14. Further, an earth spring 24 is interposed between the top plate 20 and the printed circuit wiring board 14 with its lower end being in contact with the earth pattern 23 and its upper end with the rear surface of the top plate 20. Accordingly, the shutter plate 17 is connected with the earth pattern 23 through the top plate 20 and the earth spring 24, whereby static electricity is constantly relieved to the earth pattern 23.

When the memory card of such improved construction as mentioned above is adopted, the contact pattern 5 can be kept away from direct contact with an external object by closure of the shutter plate 17 as shown in FIG. 7 during non-use of the memory card 4, whereby there is no possibility of the contact pattern being corroded to bring about poor contact with the connector, and of static electricity destroying the memory elements in the card.

However, even the memory card having the above-described adavantages is not free of disadvantages in opening and closing the shutter plate 17 at the time of its mounting and dismounting. Further, since the shutter plate 17 is made of a metal material of good electric conductivity as the measures to be taken against static electricity, if it is forgotten to open the shutter plate 17 at the time of mounting the memory card, the shutter plate comes inevitably into direct contact with a plurality of contacts in the press-contact type connector 8 to cause short-circuiting among those plurality of contacts. Thus, the risk of destroying the circuits and component parts in the electronic apparatus main body 1 exists. Furthermore, when frequency of opening and closing of the shutter plate 17 increases, a space gap between the top plate 20 and the spacer 25 becomes large with the consequence that the shutter plate 17 tends to open with even a slight shock applied to the card 4 when it is not in use, and the connection pattern 5 is exposed to the outside attracting dust particles, etc. onto it. In this state, when the memory card is mounted on the electronic apparatus, no perfect electrical connection can be made.

SUMMARY OF THE INVENTION

It is therefore an object of the present invention to provide an electronic apparatus with an improved structure, wherein the shutter plate can be opened without failure in association with mounting operation of the external connection device, and the electrical connection can be secured between the electronic apparatus and the external memory device.

It is another object of the present invention to provide an external connection device which is capable of perfectly protecting the connection part to be electrically connected with the electronic apparatus main body when it is not in use.

BRIEF DESCRIPTION OF THE DRAWINGS

FIGS. 1 to 3 show a structure of the conventional device, wherein

FIG. 1 is a perspective view showing an electronic apparatus main body and a memory card;

FIG. 2 is a perspective view for explaining the relationship between the housing section of the electronic apparatus main body and the memory card; and FIG. 3 is a longitudinal cross-sectional view of the device taken along a line 3—3 in FIG. 2;

FIGS. 4 to 8 show another structure of the conventional device, wherein

FIGS. 4 and 5 are perspective views of the memory card in the state of its shutter plate being closed and opened respectively;

FIG. 6 is a partially enlarged, longitudinal cross-sectional view of the device shown in FIGS. 4 and 5;

FIG. 7 is a plan view showing a state of the shutter plate being opened; and

FIG. 8 is an exploded perspective view of the device shown in FIGS. 4 to 7; and

FIGS. 9 to 12 show a preferred embodiment of the present invention, wherein

FIG. 9 is a perspective view of the device;

FIG. 10 is a plan view of the device;

FIG. 11 is an enlarged, longitudinal cross-sectional view of the device according to the present invention taken along a line 11—11 in FIG. 9; and FIG. 12 is also an enlarged, longitudinal cross-sectional view of the device taken along a line 12—12 in FIG. 9.

DETAILED DESCRIPTION OF A PREFERRED EMBODIMENT

Figure 1:
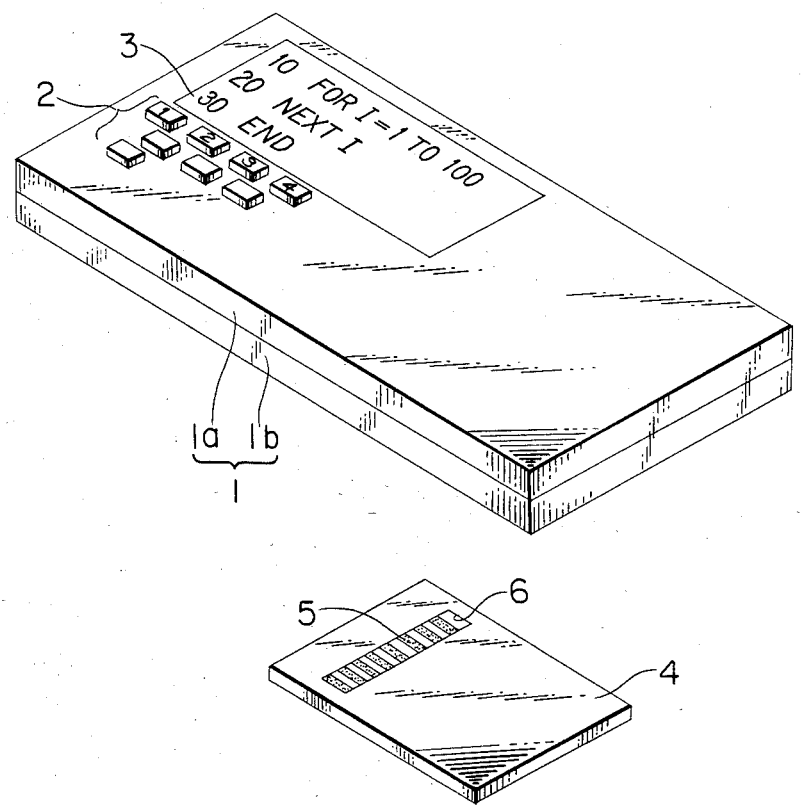
Figure 2:
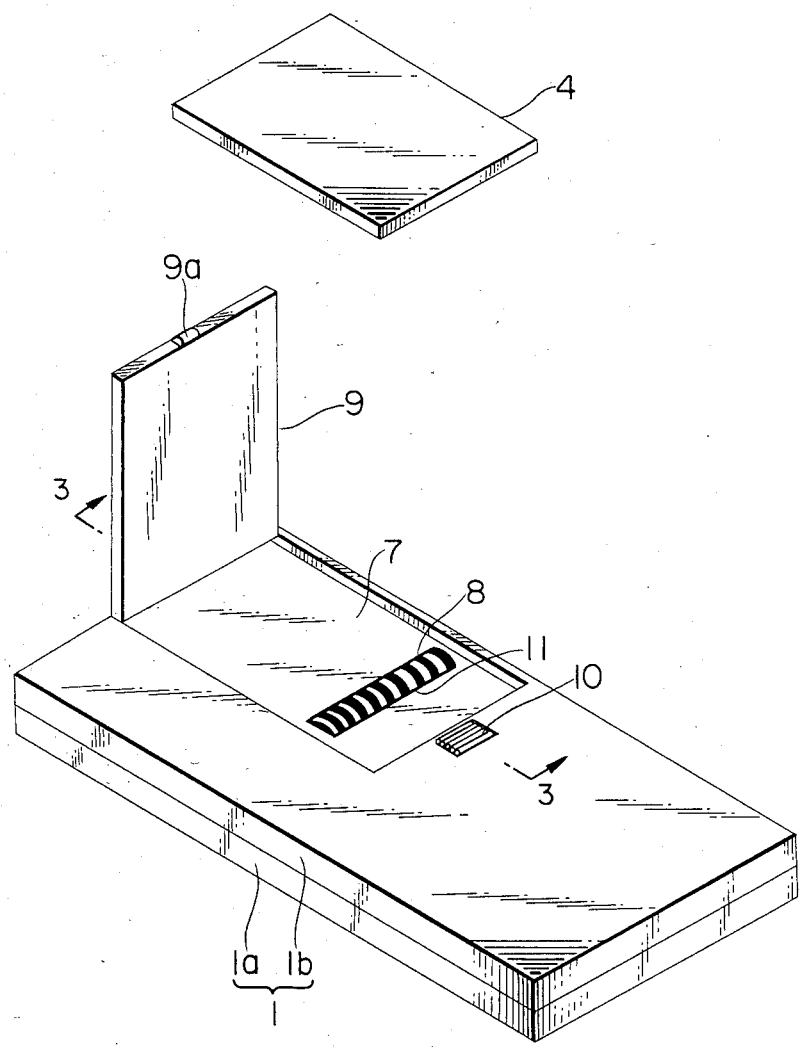
Figure 3:
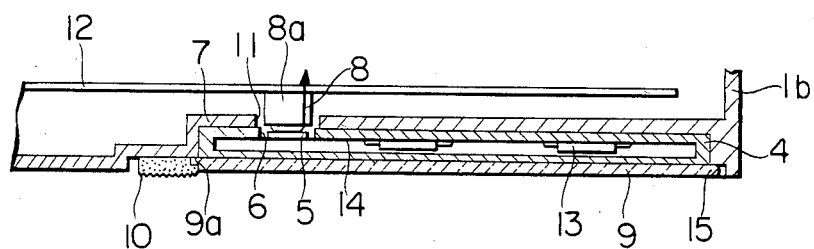
Figure 4:
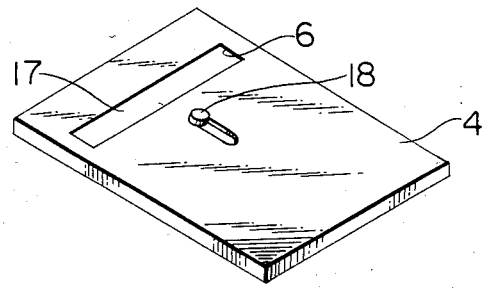
Figure 5:
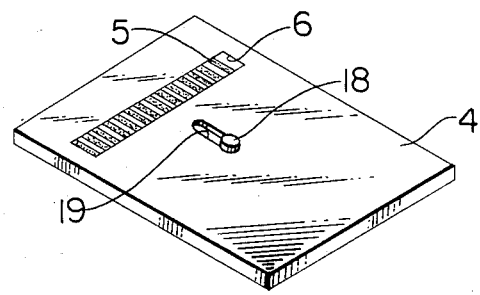
Figure 6:
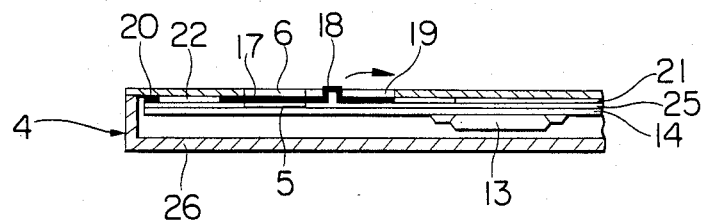
Figure 7:
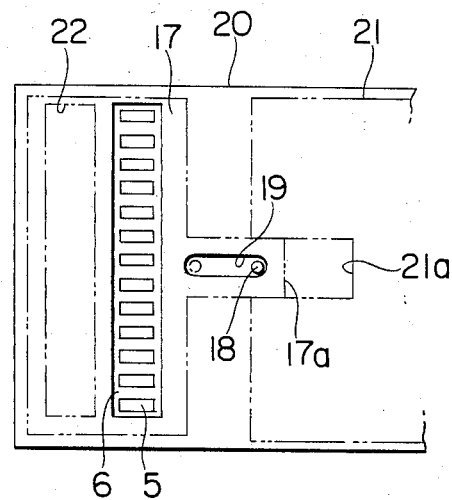
Figure 8:
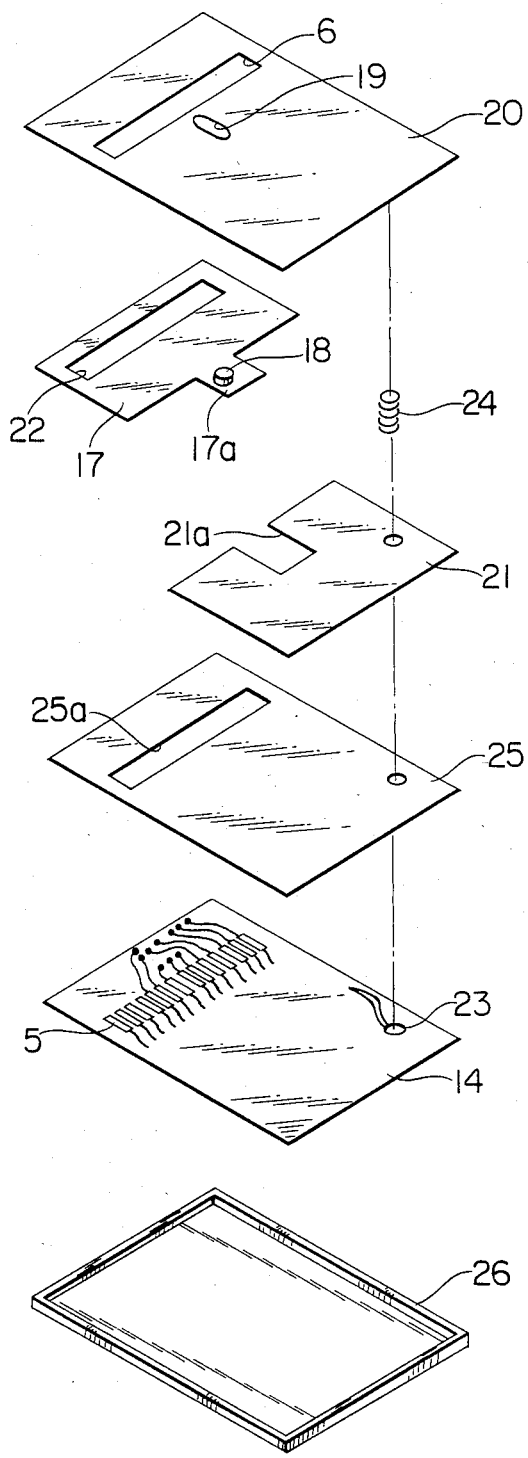
Figure 9:
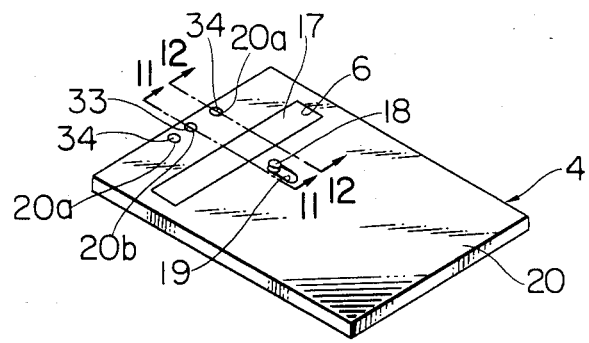

In the following, the present invention will be explained in detail with reference to a preferred embodiment thereof shown in the drawing.

FIGS. 9 to 12 are for explanation of one preferred embodiment of the electronic apparatus according to the present invention, wherein those parts identical or equivalent to those in FIGS. 1 through 8 are designated by the same reference numerals, and the explanations for them are dispensed with.

In the present embodiment, lugs 28, 28 project from both left and right end parts of the shutter plate 17 and, at the same side thereof where the male part 17a is formed, other lugs 29, 29 are project from the side walls of the lower casing 26 of the memory card in confrontation to the pair of lugs 28, 28. A spring 27 is extended between the mutually opposed lugs 28, 29 on each side to impart tensile force to the shutter plate 17 in its constantly opening direction, i.e., a direction in which the opening 22 in the shutter plate 17 and the contact pattern 5 are brought to a matching position. An opening 30 is formed in the shutter plate 17 at the middle part and near the distal end thereof opposite to the end side where the male part 17a and the lugs 28, 28 are formed.

Figure 11:
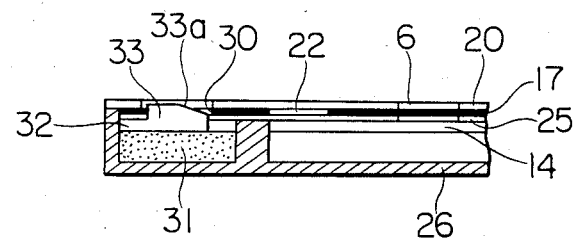
Figure 12:
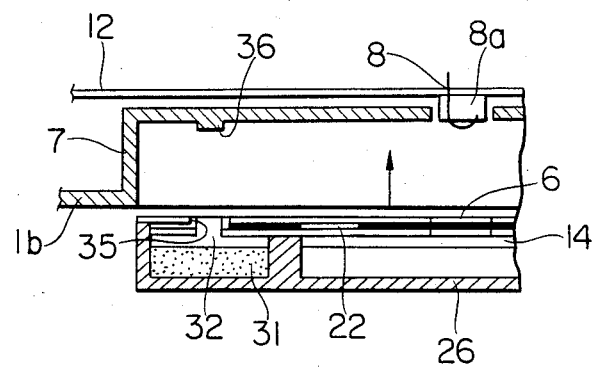

At the end part of the memory card 4 to the side where the contact pattern 5 is positioned, i.e., the end part thereof to the side where the shutter plate 17 is closed, there is disposed a stopper member 32 through a cushion member 31 beneath it as shown in FIG. 11. The stopper member 32 has in the middle part thereof a projection 33 at a position corresponding to the opening 30 formed in the shutter plate 17, and, at both left and right sides of this projection 33, there extend projections 34 in a manner to interpose the projection 33 between them.

Figure 10:
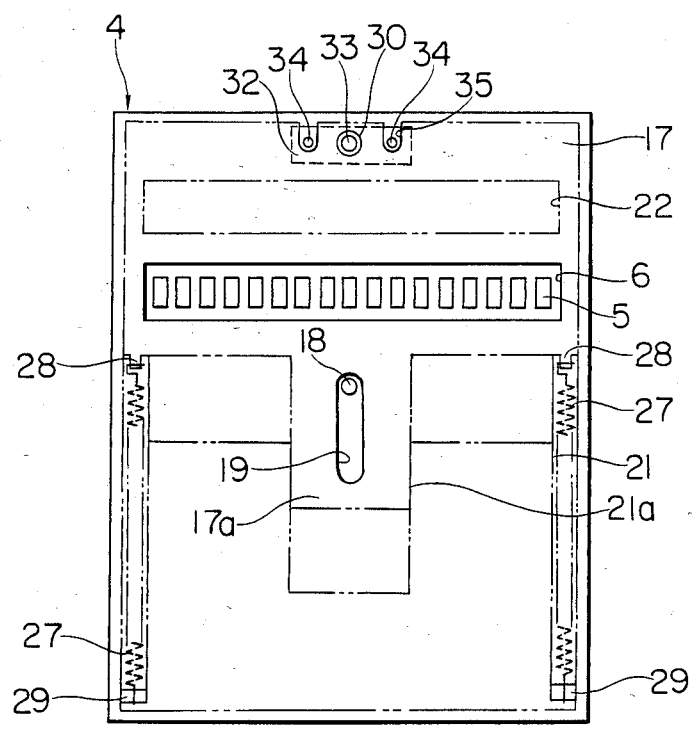

At the distal end part of the shutter plate 17, there are formed notched portions 35, 35 that avoid the projections 34, 34 as shown in FIG. 10. Further, the top plate 20 of the memory card 4 has perforations 20a, 20a and 20b formed at positions corresponding to the above-mentioned projections 34, 34, and 33, respectively, so that, upon closure of the shutter plate 17, these projections may be engaged with the perforations and appear therein. Furthermore, projections 36, 36 are provided on the bottom plate of the housing section 7 in the electronic apparatus main body 1 at positions corresponding to the above-mentioned projections 34, 34.

In the following, explanations will be given as to the method for mounting and demounting the memory card of the above-described construction on and from the electronic apparatus main body.

In its state of non-use, the shutter plate 17 is displaced by pushing the knob 18 toward the window opening 6 in the top plate 22 against the tensile force of the springs 27 to be brought to a state with the projection 33 on the stopper member 32 being fitted into the perforation 30 formed at the forward end part of the shutter plate 17. The plate is latched at its engaged position against the tensile force of the springs 27 by engagement of the projection with the perforation 30.

In the above-described condition, the window opening 22 of the shutter plate 17 is at a position beyond the window opening 6 of the top plate 20, whereby the contact pattern 5 is closed by the shutter plate 17 to be hidden from the window opening 6. This condition is indicated with double-dot-and-dash lines in FIG. 10, the longitudinal cross-section of which is shown in FIG. 11.

When shifting the shutter plate 17 for its closure of the opening 22, the distal end of the shutter plate is caused to ride on an inclined surface 33a formed on the projection 33 at its edge to the side of the shutter plate, on account of which the projection 33 is pushed downward and the stopper member 32 is also in a state of its being depressed downward against the elastic force of the cushion member 31. Therefore, the stopper member 32 constantly receives upward urging force from the cushion member 31 due to its elasticity, and, when the distal end of the shuttr plate 17 rides over the projection 33, the projection 33 can be fitted into the perforation 30.

In the above-described condition, the projections 34, 34 at both left and right sides of the projection 33 pass by the notches 35, 35 formed at the forward end of the shutter plate 17 to be fitted in the perforations 20a, 20a formed at the forward end part of the top plate 20, whereas the projection 33 is fitted in the perforation 20b.

In this closed state of the memory card, it is placed in the housing section 7 of the electronic apparatus main body 1. In placing the memory card in the housing section 7, the top plate 20 thereof is faced to the bottom plate of the housing section 7. Then, the projections 34, 34 on the stopper member 32 come to meet the projections 36, 36 provided on the bottom plate of the housing section 7 to be pushed by the counterparts against th elastic force of the cushion member 31. On account of this, the projections 34, 34 are pushed down and disengaged from the top plate 20, perforations 20a, 20a in the top plate 20, and the notched portions 35, 35 with the consequence that the projection 33 is also disengaged from the perforation 30, thereby being released from the shutter plate 17. This releasing causes the backward sliding of the shutter plate 17 by force of the springs 27. As soon as the male part 17a of the shutter plate 17 comes into contact with the innermost end of the female part 21a of the guide plate 21, it stops further movement. At this instant, the knob 18 on this shutter plate 17 comes into contact with the end of the slot 19 opposite to the opening 16 and stops its further motion.

In the above-described condition, the opening 22 of the shutter plate 17 meets the window opening 6 of the top plate 20 and the window opening 25a of the spacer 25, whereby the contact pattern 5 becomes exposed to the outside and contacts with the press-contact type connector 8 to realize the electical connection between them.

As the consequence of this, the shutter plate is automatically opened in association with the mounting operation of the memory card onto the electronic apparatus main body, and the contact pattern is exposed to complete the electrical connection with the contact. Such construction removes all the inconveniences which have been encountered in the conventional device such that the memory card is not mounted on the electronic apparatus main body in the state of the contact pattern being covered with the shutter plate, whereby the press-contact type connector is brought in contact with the shutter plate to cause short-circuiting, resulting in destruction of the electronic circuit components at the side of electronic apparatus main body, and others.

In the foregoing, explanations have been made with the external memory device as one example of the connection device to be mounted on the electronic apparatus main body. It should, however, be noted that the present invention is equally applicable to other external connection devices.

I claim:

1. An electronic memory device detachably mountable in an electronic apparatus for making electrical connection with connection means in said electronic apparatus, said memory device comprising:

contact means including a plurality of contact elements arranged in a predetermined direction in one plane, said contact elements and said connection means further being arranged to make mutual contact when said memory device is mounted in said apparatus, thereby to establish the electrical connection of said memory device to said electronic apparatus;

plate-like opening and closing means arranged in a second plane adjacent said one plane, respectively for exposing said contact means to the outside of said memory device in an open state thereof and for covering said contact means in a closed state thereof; and moving means including engagement means for mechanically engaging said apparatus upon mounting of said memory means in said apparatus to cause said-opening and closing means to move in a direction substantially perpendicular to said predetermined direction from said closed state to said open state such that said opening and closing means exposes said contact means; said moving means further including urging means for urging said opening and closing means to move as aforesaid; said urging means and said engagement means lying substantially in at least one of said one plane and said second plane.

2. An electronic memory device according to claim 1, wherein said urging means comprises resilient means for forcing said opening and closing means to move from its closed state to its open state.

3. An electronic memory device according to claim 1, wherein said opening and closing means comprises a shutter plate which is slidable with respect to said contact means and has an opening for exposing said contact means.

4. An electronic memory device according to claim 1, wherein said opening and closing means is formed with an aperture and wherein said moving means comprises a projection member provided on said memory device that engages with said aperture to hold said opening and closing means in said closed state.

5. An electronic memory device according to claim 4, further comprising a cushion member which allows said projection member to move along its projecting direction.

6. An electronic memory device according to claim 4, further comprising housing means for said memory device and wherein said urging means comprises a spring member one end of which is connected to said opening and closing means and the other end of which is connected to said housing means.

7. An electronic apparatus and an electronic memory device detachably mountable in said electronic apparatus for making an electrical connection with connection means in said electronic apparatus, said memory device comprising:

contact means comprising a plurality of contact elements arranged in a predetermined direction in one plane, said contact elements and said connection means further being arranged to make mutual contact when said memory device is mounted in said apparatus thereby to establish the electrical connection to said electronic apparatus;

plate-like opening and closing means arranged in a second plane adjacent said one plane, respectively for exposing said contact means to the outside of said memory device in an open state thereof and for covering said contact means in a closed state thereof;

moving means, including engagement means, for causing, upon actuation of said engagement means, said opening and closing means to move in a direction substantially perpendicular to said predetermined direction such that said opening and closing means exposes said contact means; and said electronic apparatus further comprising:

means for mechanically engaging said engagement means of said moving means upon mounting of said memory device in said electronic apparatus thereby to actuate said engagement means of said moving means to cause said opening and closing means to move to said open state; and a plurality of contacts comprising said connection means positioned electrically to contact said contact means to transmit a stored signal and receive a signal to be stored said moving means further including urging means for urging said opening and closing means to move as aforesaid; said urging means and said engagement means lying substantially in at least one of said one plane and said second plane.

8. An electronic memory device detachably mountable in an electronic apparatus for making an electrical connection with said electronic apparatus, said memory device comprising:

contact means including a plurality of contact elements arranged in a predetermined direction in one plane and formed to make electrical connection with said electronic apparatus when said memory device is mounted therein; a memory circuit connected to said contact means such that said electronic apparatus can receive a stored signal and transmit a signal to be stored from and to said memory device;

plate-like cover means arranged in a second plane and movable between closed and opened positions respectively covering and exposing said contact means;

biasing means for forcing said cover means toward said open position; and means for holding said cover means in said closed position against the biasing force of said biasing means wherein when said memory device is mounted in said electronic apparatus, said contact means are exposed by movement of said cover means to said opened position and are electrically connected to said electronic apparatus such that a signal stored in said memory device can be transmitted to said electronic apparatus and said memory device can receive a signal for storage from said electronic apparatus; said biasing means and said holding means further lying substantially in at least one of said one plane and said second plane.

* * * * *

UNITED STATES PATENT AND TRADEMARK OFFICE
CERTIFICATE OF CORRECTION

PATENT NO. : 4,600,257
DATED : July 15, 1986
INVENTOR(S) : HIDEO FUSHIMOTO

It is certified that error appears in the above-identified patent and that said Letters Patent is hereby corrected as shown below:

```
Column 4, line 16, delete "are".
Column 5, line 13, change "shuttr" to --shutter--;
          line 30, change "th" to --the--.
Column 7, line 28, after "stored" insert --,--.
```

Signed and Sealed this

Fourteenth Day of October, 1986

[SEAL]

Attest:

DONALD J. QUIGG

Attesting Officer

Commissioner of Patents and Trademarks